(12) United States Patent
Meucci

(10) Patent No.: US 6,931,983 B2
(45) Date of Patent: Aug. 23, 2005

(54) DEVICE FOR CIRCULATING SEALING GAS FOR MECHANICAL DRY SEALS OF A CENTRIFUGAL COMPRESSOR AT TIMES WHEN THE MACHINE IS STATIONARY AND PRESSURIZED

(75) Inventor: Stefano Meucci, Florence (IT)

(73) Assignee: Nuovo Pignone Holding S.p.A., Florence (IT)

( * ) Notice: Subject to any disclaimer, the term of this patent is extended or adjusted under 35 U.S.C. 154(b) by 15 days.

(21) Appl. No.: 10/694,357

(22) Filed: Oct. 28, 2003

(65) Prior Publication Data

US 2005/0100454 A1 May 12, 2005

(30) Foreign Application Priority Data

Nov. 13, 2002 (IT) .................................... MI2002A2401

(51) Int. Cl.⁷ .............................. F16J 9/28; F04B 17/00
(52) U.S. Cl. ......................................... 92/248; 417/418
(58) Field of Search .......................... 92/261, 145, 248, 92/170.1; 417/418

(56) References Cited

U.S. PATENT DOCUMENTS 4,231,722 A * 11/1980 Teichmann .................. 417/418
6,789,804 B2 * 9/2004 Wilhelm ...................... 277/390
6,802,689 B2 * 10/2004 Nogiwa ........................ 415/26

* cited by examiner

Primary Examiner—Thomas E. Lazo
(74) Attorney, Agent, or Firm—Nixon & Vanderhye P.C.

(57) ABSTRACT

A device (10) for circulating sealing gas for mechanical dry seals (11) of a centrifugal compressor (13) at times when the machine is stationary and pressurized; the device comprises a sealed reciprocating compressor (12), which includes a piston (14) slidable in a cylinder (16), and the piston (14) is moved by a magnetic coupling to an external magnetic element (20) which moves along the said cylinder (16).

9 Claims, 2 Drawing Sheets

DEVICE FOR CIRCULATING SEALING GAS FOR MECHANICAL DRY SEALS OF A CENTRIFUGAL COMPRESSOR AT TIMES WHEN THE MACHINE IS STATIONARY AND PRESSURIZED

The present invention relates to a device for circulating sealing gas for mechanical dry seals of a centrifugal compressor at times when the machine is stationary and pressurized.

In general terms, a centrifugal compressor is a machine which imparts to a compressible fluid a pressure greater than the intake pressure and which transfers the energy required for this pressure increase to the fluid. It consists of one or more impellers or rotors having radial blades and driven at high speed by a motor which is generally connected directly to the compressor shaft itself.

Typically, centrifugal compressors are designed for a great variety of applications where high flow rates are required at medium to low pressures, for example in refrigeration systems, in the petrochemical industry, for example ethylene and catalytic cracking plants, and $CO_2$ compression units in urea plants, in the power industry, in liquid propane gas and oxygen plants, for instance, and in units for pressurizing gas pipelines and returning them to operation. The installed power is generally high.

In order to prevent the outflow of the treated fluid to the atmosphere, centrifugal compressors are generally fitted with mechanical dry seals positioned on the rotor shaft. A suitably treated gas, generally taken from the delivery end of the compressor itself, is made to circulate in these mechanical dry seals. When the compressor is operating in normal design conditions, the circulation is ensured by the pressure difference between the intake and delivery ends.

When the machine is stationary and pressurized, the clean sealing gas which prevents contamination by solid particles between the sealing ring and disc of each mechanical seal cannot be made to circulate. Furthermore, the gas temperature has to be sufficient to prevent the formation of condensate and/or ice between the sealing ring and disc.

The gas circulation devices currently available on the market are also fitted with mechanical seals which have their own problems of contamination and condensation similar to those mentioned above.

At the present time, where the problem of contamination is concerned, designers generally accept the risk that some solid particles will reach the mechanical seal, and preventive maintenance operations are therefore provided.

As regards the problem of condensate and/or ice formation between the sealing ring and disc of mechanical seals, it has been proposed that the customer should be instructed to depressurize the machine and the circuit concerned when the machine is stopped, as a recommendation for proper use forming part of the terms of the guarantee.

Depending on circumstances, depressurizing can cause economic losses which may be significant for the manager of the installation, and/or a certain degree of pollution.

The problem has been discussed many times by manufacturers of centrifugal compressors and their customers, but since no reliable solutions are available on the market, customers are inevitably obliged to accept the conditions of operation described above.

The object of the present invention is therefore to overcome the aforementioned problems and in particular the problem of providing a device for circulating sealing gas for mechanical dry seals of a centrifugal compressor which can operate at times when the machine is stationary and pressurized.

Another object of the present invention is to provide a device for circulating sealing gas for mechanical dry seals of a centrifugal compressor at times when the machine is stationary and pressurized, which is particularly reliable, with no possibility of gas leaks, simple, functional, and relatively inexpensive.

These and other objects of the present invention are achieved by providing a device for circulating sealing gas for mechanical dry seals of a centrifugal compressor at times when the machine is stationary and pressurized, as described in claim 1.

Further characteristics of a device for circulating sealing gas for mechanical dry seals of a centrifugal compressor at times when the machine is stationary and pressurized are described in the subsequent claims.

The characteristics and advantages of a device according to the present invention for circulating sealing gas for mechanical dry seals of a centrifugal compressor at times when the machine is stationary and pressurized will be made clearer by the following description, provided by way of example and without restrictive intent, with reference to the attached schematic drawings, in which.

Figure 1:
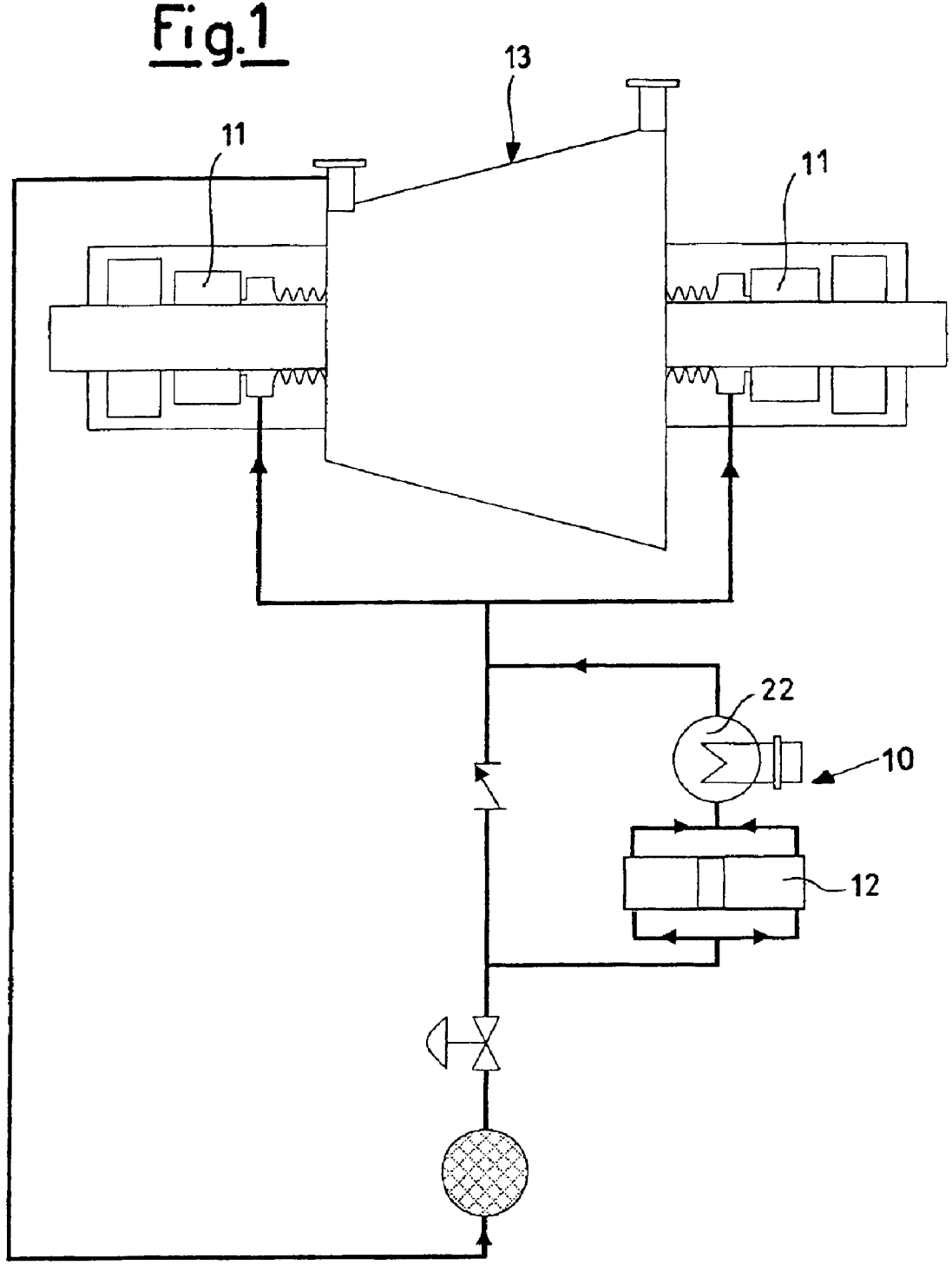
FIG. 1 shows a centrifugal compressor fitted with mechanical dry seals, supplied by a sealing gas circulation device according to the present invention.
Figure 2:
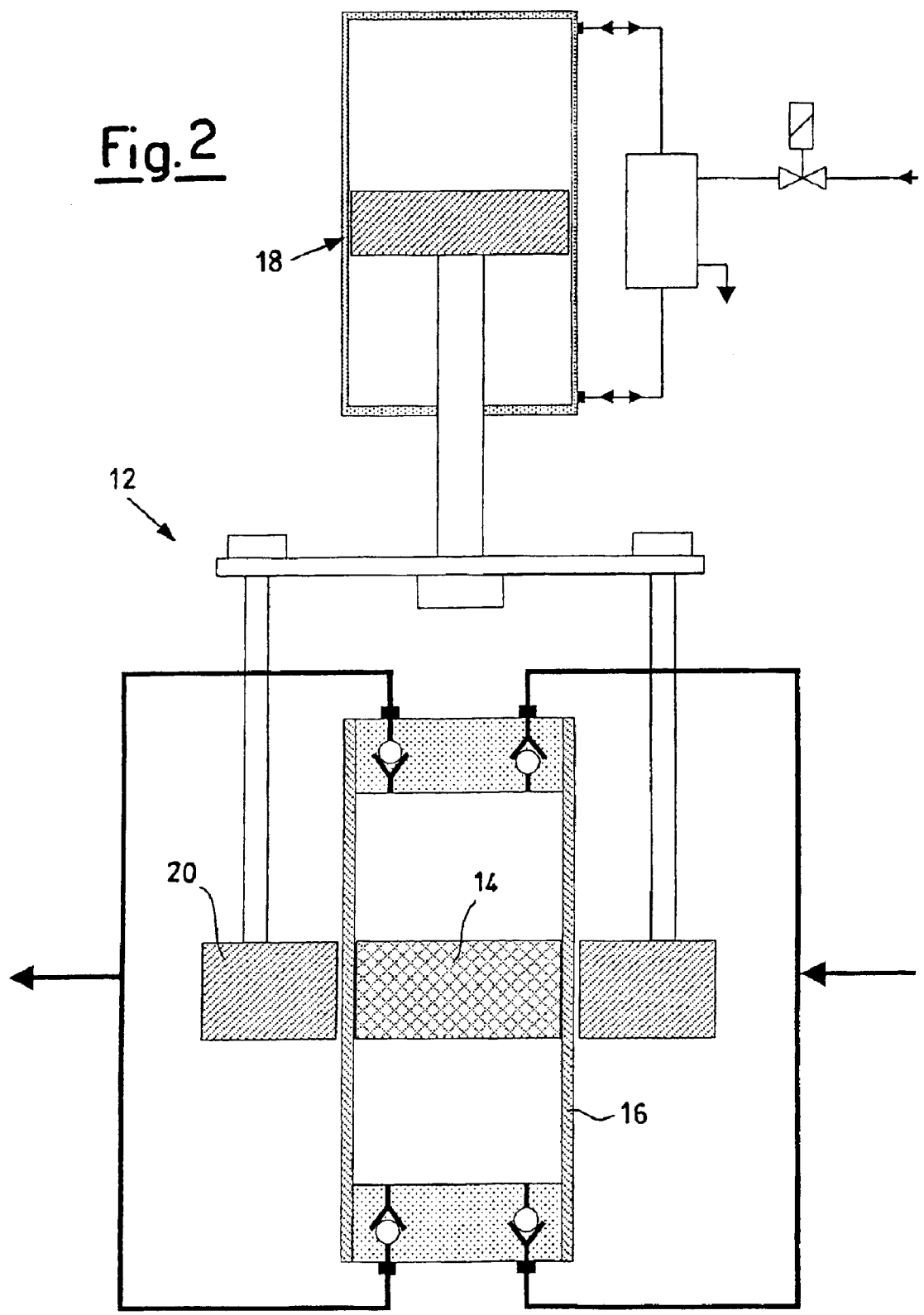
FIG. 2 is a device for circulating sealing gas for mechanical dry seals of a centrifugal compressor which operates at times when the machine is stationary and pressurized.

With reference to the figures, these show a sealing gas circulation device, indicated as a whole by 10, for mechanical dry seals 11 of a centrifugal compressor 13 which also operates at times when the machine is stationary and pressurized.

In the illustrated example, according to the present invention, the sealing gas circulation device 10 comprises a double-acting reciprocating compressor 12 which is small and fully sealed.

The reciprocating compressor 12 includes a piston 14 made from metallic material and slidable in a cylinder 16 of nonmagnetic material.

A reciprocating motor 18 of the pneumatic type is also provided. The motor 18 moves an external magnetic element 20, such as a ring, along the cylinder 16.

The operation of the sealing gas circulation device 10 for mechanical dry seals 11 of a centrifugal compressor 13 according to the invention is clear from what has been described above with reference to the figures, and can be summarized as follows.

The movement to the piston 14 is transmitted by a magnetic coupling from the outside of the cylinder 16 of nonmagnetic material, by means of the magnetic element 20.

The magnetic element 20 is displaced by the reciprocating motor 18 which moves it along the cylinder 16.

The magnetic field of the magnetic element 20 in turn causes the movement of the piston 14, generally made from a metallic material or other material sensitive to the magnetic field.

Because of the absence of any seal in contact with the exterior, the gas circulation device 10 according to the invention is particularly suitable for applications using dangerous gases and high pressures of up to 450 bar.

It should be noted that the gas circulation device 10 according to the invention can also comprise a heater 22, through which the gas moved by the reciprocating compressor 12 passes, as shown in FIG. 1.

Thus the gas is raised to a sufficient temperature to prevent the formation of condensate and/or ice between the sealing ring and disc of the mechanical dry seals 11.

The very high reliability of the equipment makes it suitable for any application with any type of gas.

The above description clearly demonstrates the characteristics of the device for circulating sealing gas for mechanical dry seals of a centrifugal compressor at times when the machine is stationary and pressurized, according to the present invention, together with its advantages.

Some concluding observations are provided below in order to define the aforesaid advantages more precisely and clearly.

In the first place, it should be noted that the sealing gas circulation device according to the invention also operates at times when the centrifugal compressor is stationary and pressurized, without problems in respect of condensate formation and contamination.

Thus the customer is no longer required to depressurize the machines when they are stationary, and therefore the manager of the installation can avoid the consequent economical losses as well as the undesirable implications of pollution. The solution provided by the sealing gas circulation device of the present invention will be attractive to customers and could be the decisive factor in negotiations, since it distinguishes the device from competing products.

Finally, it should be pointed out that the device for circulating sealing gas for mechanical dry seals according to the invention is simple to use, reliable, and inexpensive with respect to the known art.

Lastly, it is clear that the device for circulating sealing gas for mechanical dry seals of a centrifugal compressor at times when the machine is stationary and pressurized, designed in this way, can be modified and varied in numerous ways within the scope of the invention; moreover, all the components can be replaced with technically equivalent elements. In practice, the materials used, as well as the shapes and dimensions, can be chosen at will, subject to technical requirements.

The scope of protection of the invention is therefore delimited by the attached claims.

What is claimed is:

1. A device for circulating sealing gas for mechanical dry seals of a centrifugal compressor at times when the compressor is stationary and pressurized, comprising: a sealed reciprocating compressor, the reciprocating compressor including a piston slidable in a cylinder, said piston being movable by a magnetic coupling between said piston and an external magnetic element and movable along said cylinder to move gas from the reciprocating compressor to the dry seals and a heater for receiving the gas moved by said reciprocating compressor and raising the temperature of the gas to a sufficient temperature to prevent the formation of condensate and/or ice between a sealing ring and disc of said mechanical dry seals.

2. Gas circulation device according to claim 1, wherein said external magnetic element is moved by a reciprocating motor.

3. Gas circulation device according to claim 2, wherein said reciprocating motor is of the pneumatic type.

4. Gas circulation device according to claim 1, wherein said external magnetic element is a ring which is moved outside the said cylinder.

5. Gas circulation device according to claim 1, wherein said cylinder is made from nonmagnetic material.

6. Gas circulation device according to claim 1, wherein said piston is made from a material sensitive to a magnetic field.

7. Gas circulation device according to claim 6, wherein said piston is made from a metallic material.

8. Gas circulation device according to claim 1, wherein said reciprocating compressor is double-acting.

9. Gas circulation device according to claim 1, wherein dimensions of said reciprocating compressor are small.

* * * * *